United States Patent
Waldron et al.

(10) Patent No.: US 9,090,353 B2
(45) Date of Patent: Jul. 28, 2015

(54) MOUNTING ASSEMBLY

(75) Inventors: Dominic A. Waldron, Swadlincote (GB); Peter Beardsley, Derby (GB)

(73) Assignee: ROLLS-ROYCE PLC, London (GB)

( * ) Notice: Subject to any disclaimer, the term of this patent is extended or adjusted under 35 U.S.C. 154(b) by 208 days.

(21) Appl. No.: 13/493,469

(22) Filed: Jun. 11, 2012

(65) Prior Publication Data

US 2012/0324907 A1    Dec. 27, 2012

(30) Foreign Application Priority Data

Jun. 22, 2011    (GB) .................................. 1110512.9

(51) Int. Cl.
*B64D 29/06* (2006.01)
*F02C 7/20* (2006.01)
*B64D 27/26* (2006.01)

(52) U.S. Cl.
CPC ............... *B64D 29/06* (2013.01); *B64D 27/26* (2013.01); *F02C 7/20* (2013.01); *B64D 2027/262* (2013.01); *B64D 2027/264* (2013.01); *B64D 2027/266* (2013.01); *Y02T 50/44* (2013.01)

(58) Field of Classification Search
CPC ............. B64D 27/26; B64D 2027/262; B64D 2027/264; B64D 2027/266; B64D 2027/268; F02C 7/20
USPC ............................... 60/796–797, 799; 244/54
See application file for complete search history.

(56) References Cited

U.S. PATENT DOCUMENTS

| | | | |
|---|---|---|---|
| 5,524,847 A * | 6/1996 | Brodell et al. .................. 60/797 |
| 8,042,342 B2 * | 10/2011 | Diochon et al. ................ 60/797 |
| 8,177,166 B2 * | 5/2012 | Haack ........................... 244/119 |
| 8,651,416 B2 * | 2/2014 | Journade et al. ................. 244/54 |
| 8,876,042 B2 * | 11/2014 | LaChapelle et al. ............. 244/54 |
| 2008/0067287 A1 | 3/2008 | Guibert et al. |
| 2009/0183512 A1 * | 7/2009 | Suciu et al. ...................... 60/797 |
| 2009/0212155 A1 | 8/2009 | Huggins et al. |
| 2009/0266932 A1 * | 10/2009 | Roche et al. ..................... 244/54 |
| 2010/0040466 A1 | 2/2010 | Vauchel et al. |
| 2012/0111995 A1 * | 5/2012 | Lafont ............................. 244/54 |

FOREIGN PATENT DOCUMENTS

| | | |
|---|---|---|
| EP | 1 878 662 A1 | 1/2008 |
| EP | 2 202 153 A2 | 6/2010 |
| FR | 2 913 664 A1 | 9/2008 |
| GB | 2 274 490 A | 7/1994 |

OTHER PUBLICATIONS

Sep. 28, 2011 Search Report issued in British Patent Application No. GB1110512.9.

* cited by examiner

*Primary Examiner* — Gerald L Sung
(74) *Attorney, Agent, or Firm* — Oliff PLC

(57) ABSTRACT

A mounting assembly for attaching a ducted fan gas turbine engine that includes an intake, a propulsive fan, a fan case surrounding the fan, and a core engine. The air intake is attached to the front of the fan case such that loads acting on the air intake are transmitted to the fan case. The mounting assembly includes: a support structure extending in an axial direction of the engine and having a rearward region adapted to attach to the aircraft; and a load distribution ring coaxial with and rearward of the fan case, adapted to join to the fan case, and joined to a forward region of the support structure. The support structure and the load distribution ring are adapted such that the primary load path for the loads transmitted to the fan case by the air intake is through the load distribution ring and the support structure.

9 Claims, 2 Drawing Sheets

MOUNTING ASSEMBLY

FIELD OF THE INVENTION

The present invention relates to a mounting assembly for attaching a ducted fan gas turbine engine to an aircraft.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and an exhaust nozzle 19. A nacelle 21 generally surrounds the engine 10 and defines the intake 11, a bypass duct 22 and a bypass exhaust nozzle 23. A row of outlet guide vanes 24 is positioned in the bypass duct 22 rearward of the fan 12. A case 25 at the outer wall of the bypass duct 22 surrounds the fan 12 and the outlet guide vanes 24. The case 25 may be formed as different sections, and is strengthened to contain a fan blade in the unlikely event of a fan blade-off. The intermediate pressure compressor 13, high-pressure compressor 14, combustion equipment 15, high-pressure turbine 16, intermediate pressure turbine 17, low-pressure turbine 18 and exhaust nozzle 19 form the core engine 26.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

FIG. 2 shows schematically a perspective view from the rear of an engine similar to that shown in FIG. 1, but without the nacelle 21. The engine can be attached to an aircraft at an under wing pylon 27. Conventionally, the mounting assembly for the engine uses engine mounts which provide a detachable interface for the entire engine.

A forward engine mount 28 is attached to the case 25 and restrains the engine in side and vertical DOF (degrees of freedom). The case 25 and outlet guide vanes 24 can form a fan structure which is a major part of the engine architecture, the case 25, in particular, providing a mount ring for the forward engine mount 28, a rear fan case section (including a stiffener), and a forward containment fan case section. The fan structure can also include A frames 29 extending between the rear of the case 25 and the core engine 26. The fan structure provides a hard point for the front mount 28, and connects the case 25 to the core engine 26 in six DOE The core engine 26 is also attached to the pylon 27 at a tail bearing housing via a rear engine mount 30, this provides load transfer capability at the rear, and restrains the engine in side, vertical and roll DOFs. The axial DOF is restrained using thrust struts 31. The thrust struts 31 are attached to the rear engine mount 30 via a balance beam and extend forward to positions adjacent the A-frame 29 attachment positions on the core engine 26 to provide thrust load transfer capability only. The mounting assembly is effective in balancing flight generated loads (intake couple), with engine generated loads (thrust) to reduce "core bending". Such bending can result in reductions in blade tip clearances, and is therefore detrimental to engine efficiency and performance as greater tip clearances are required to avoid rubs and tip wear.

As the split line between the aircraft and engine is at the engine mounts 28, 30, the assembly imposes a method of engine overhaul in which for major operations the whole engine is removed from under wing and transported to an overhaul base for maintenance work to be carried out. This can be both costly and time-consuming. In particular, as bypass ratios and fan diameters increase to meet growing demands in efficiency and noise reduction, it becomes a greater challenge to transport these large structures using both road and air freight.

The intake 11 is attached to the front of the case 25 such that normal aerodynamic loads and exceptional loads, e.g. due to fan blade off events, acting on the intake are transmitted from the intake to the case. However, as bypass ratios increase, the engine core diameter is reduced, and this reduction in core size has a negative effect on the structural ability of the engine to resist core bending. In particular, aerodynamic manoeuvring loads acting on the intake (caused, for example, by the aircraft angle of attack at takeoff) and transmitted to the case can lead to core bending. In addition, exceptional loads, such as gust loads, heavy landing loads, and fan blade off loads, can also act at times on the intake.

A further problem with the fan structure discussed above in relation to FIG. 2 is that the extra length of the case 25 to accommodate the A frames 29 can increase the length of the nacelle 21 and thereby reduce performance by increasing weight and drag. In addition, the A frames 29 cut across the air flow B through the bypass duct 22, and therefore impose an inherent drag penalty.

EP A 2202153 proposes a monolithic structure for mounting an engine to an aircraft.

SUMMARY OF THE INVENTION

An aim of the present invention is to provide a mounting assembly which addresses one or more of the problems with the conventional mounting assembly discussed above.

Accordingly, a first aspect of the present invention provides a mounting assembly for attaching a ducted fan gas turbine engine to an aircraft, the engine having an intake, a propulsive fan, a fan case surrounding the fan, and a core engine, the air intake being attached to the front of the fan case such that loads (e.g. aerodynamic manoeuvring loads) acting on the air intake are primarily transmitted to the fan case, wherein the assembly includes:

a support structure extending in an axial direction of the engine and having a rearward region which is adapted to attach to the aircraft, and a load distribution ring which is coaxial with and rearward of the fan case, the load distribution ring being adapted to join to the fan case, and being joined to a forward region of the support structure; and wherein the support structure and the load distribution ring are adapted such that the primary load path for the loads transmitted to the fan case by the air intake is through the load distribution ring and the support structure, and thence to the aircraft.

Advantageously, the loads transmitted to the fan case can thereby substantially bypass the core engine, which can help to reduce the amount of core bending. Thus formations such as the A frames of the conventional mounting assembly can be eliminated. This can provide further advantages of weight reduction and drag reduction (through loss of the A frames and also through reduction in length of the case and typically also the nacelle). In addition, the mounting assembly is compatible with a method of engine overhaul in which only the core engine is removed from under wing, i.e. in which the fan structure remains in place.

Relative to the proposal of EP A 2202153, the primary load path provided by the mounting assembly advantageously is not concentrated at top dead centre in the nacelle outside the fan case. More particularly, this avoids a concern that an extreme blade-off event that punctured or severely distorted the case at top dead centre could actually endanger the attachment of the engine to the aircraft.

The mounting assembly may have any one or, to the extent that they are compatible, any combination of the following optional features.

The rearward region of the support structure can attach to the aircraft at a pylon thereof, e.g. at an under wing pylon, although other pylon positions are also possible. Alternatively, the support structure can be a pylon of the aircraft. The rearward region of the structure can then attach to the aircraft e.g. at a wing spar.

Preferably, the primary load path is circumferentially distributed around an annular joint between the fan case and the load distribution ring. This helps to reduce point loads, providing a more efficient and safer load transferring structure.

The load distribution ring may be integrally formed with the forward region of the support structure. For example, the load distribution and the support structure may be formed as a single, non-disassemblable unit. However alternatively, the load distribution ring may be removably joined to the forward region of the support structure, for example across a bolted interface.

The load distribution ring can be removably joined to the fan case, for example across a bolted annular interface. However alternatively, the load distribution ring may be integrally formed with the fan case.

The load distribution ring may be integrally formed with or removably joined (e.g. across a bolted interface) to an annular thrust reverse unit which is coaxial with and rearward of the load distribution ring. The support structure and the load distribution ring can then also be adapted such that the primary load path for forces acting on the thrust reverse unit and transmitted to the aircraft is via the load distribution ring and the support structure.

Preferably, the mounting assembly further includes a plurality of circumferentially distributed load transfer webs extending forward from the load distribution ring towards the fan case. The webs can strengthen and rigidify the load distribution ring. The webs may be integrally formed with the load distribution ring.

The engine typically further has a row of outlet guide vanes rearward of the fan case. The load distribution ring can then surround the outlet guide vanes. Thus the load distribution ring can also act as a support structure for retaining the outlet guide vanes. In such an arrangement, many parts of the load distribution ring surrounding and supporting the outlet guide vanes (particularly those parts distal from the join with the support structure) may be sufficient on their own to transmit loads received from the fan case towards the support structure. However, the load distribution ring may have a supplementary portion rearwards of the outlet guide vanes to strengthen and rigidify the load distribution ring. The supplementary portion may extend only up to about 90° (preferably only up to about 60°) around the axial direction of the engine from either side of the join with the support structure to strengthen and rigidify the load distribution ring at those positions where the transmitted loads are concentrated in the ring.

Alternatively, when the engine has a row of outlet guide vanes, these may be surrounded and supported by the fan case.

When the load distribution ring surrounds a row of outlet guide vanes and the mounting assembly further includes load transfer webs, the webs can be circumferentially positioned relative to (e.g. aligned with) the outlet guide vanes to help to transfer loads on the outlet guide vanes to the load distribution ring.

The support structure and the load distribution ring, and optionally the webs, may be predominantly formed of composite material, such as fibre-reinforced plastic. The composite material can be configured to efficiently transfer loads from the load distribution ring to the support structure, and to circumferentially distribute the primary load path around the ring.

A second aspect of the present invention provides a ducted fan gas turbine engine having an air intake, a propulsive fan, a fan case surrounding the fan, and a core engine, the air intake being attached to the front of the fan case such that loads acting on the air intake are primarily transmitted to the fan case, wherein the gas turbine engine further has a mounting assembly according to the first aspect for attaching the gas turbine engine to an aircraft.

The gas turbine engine can include a rear engine mount for attaching a rearward region of the core engine to the aircraft. The gas turbine engine can include one or more thrust struts extending forward from the rear engine mount to a forward region of the core engine.

The engine may further have an annular thrust reverse unit which is coaxial with and rearward of the load distribution ring and mounted to the ring. The load distribution ring may be integrally formed with or removably joined (e.g. across a bolted interface) to the thrust reverse unit. The support structure and the load distribution ring can then also be adapted such that the primary load path for forces acting on the thrust reverse unit and transmitted to the aircraft is via the load distribution ring and the support structure. Some loads, however, may be transmitted directly from the thrust reverse unit to the support structure.

The radially inner ends of the outlet guide vanes may terminate at one or more annular flanges which are coaxial with the fan case, a non-permanent (e.g. bolted) rigid interface being formed between the engine core and the annular flanges. Such an interface is compatible with on-wing core engine removal. Additionally, the rigid interface can help the core engine to remain coaxial with the fan structure and resist core bending.

BRIEF DESCRIPTION OF THE DRAWINGS

Embodiments of the invention will now be described by way of example with reference to the accompanying drawings in which.

DETAILED DESCRIPTION

Figure 1:
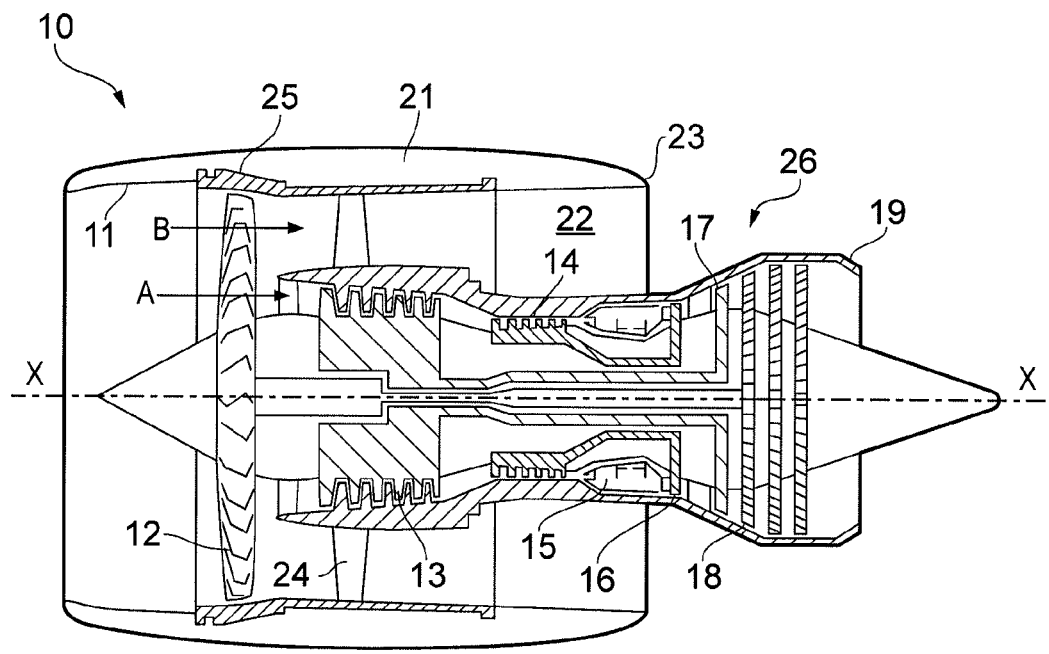
FIG. 1 shows schematically a longitudinal cross-section through a ducted fan gas turbine engine.
Figure 2:
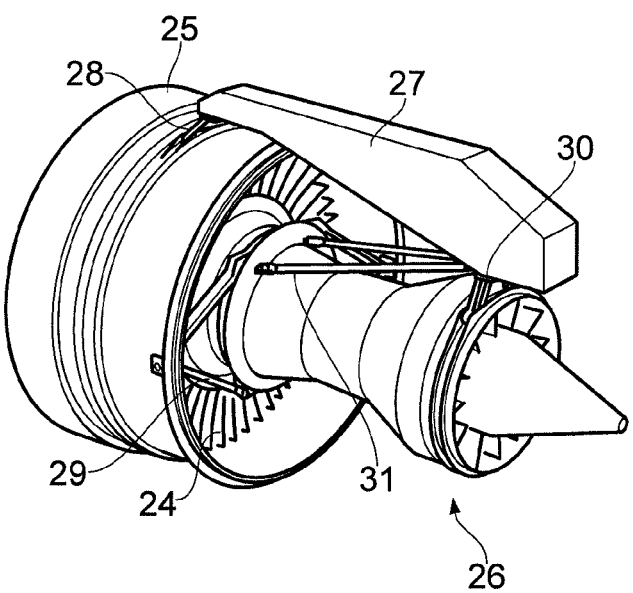
FIG. 2 shows schematically a rear perspective view of an engine similar to that shown in FIG. 1.
Figure 3:
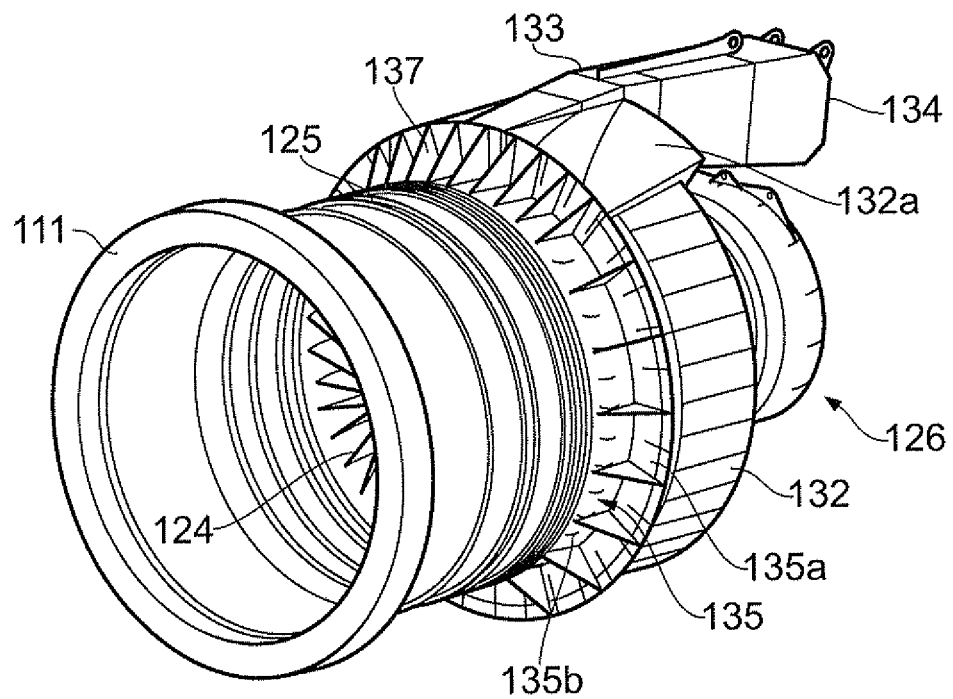
FIG. 3 shows schematically a front perspective view of a ducted fan gas turbine engine.
Figure 4:
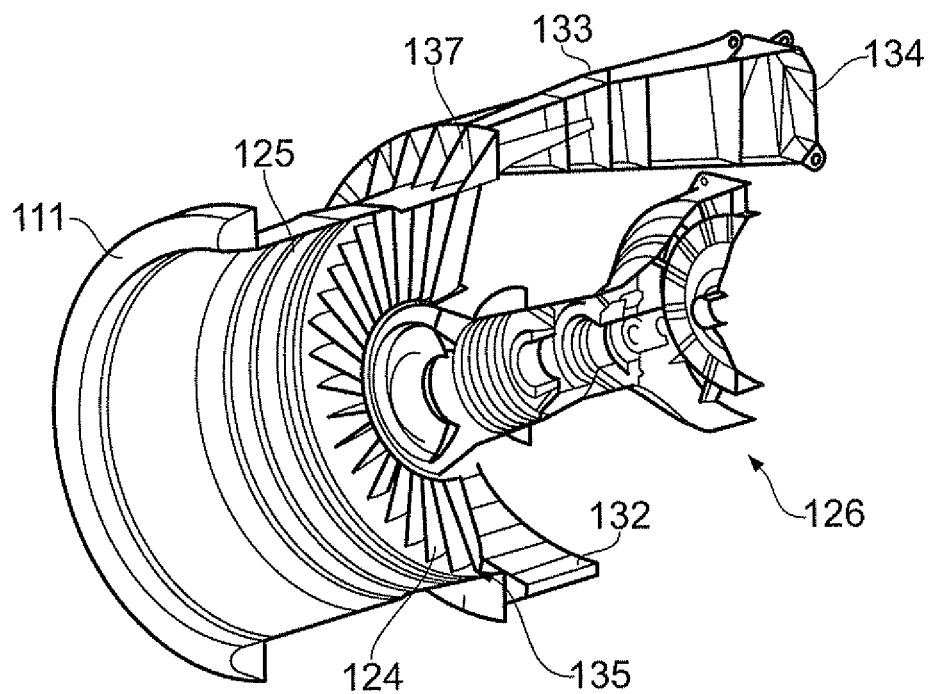
FIG. 4 shows schematically a longitudinally-sectioned front perspective view of the engine of FIG. 3.

FIGS. 3 and 4 show schematically respectively a front perspective view and a longitudinally-sectioned front perspective view of a ducted fan gas turbine engine, but without its fan and nacelle.

The engine comprises an air intake 111, a row of outlet guide vanes 124, a fan case 125 that surrounds the fan (not shown), and a core engine 126. The air intake 111 is mounted by bolted flanges to the front of the fan case 125. The engine also comprises a thrust reverse unit (TRU) 132 in the form of a structural cascade ring coaxial with and located rearwards of the fan case 125. To operate the TRU 132, the rear section of the nacelle (not shown) translates back causing blocker doors to close off the bypass duct and revealing a plurality of circumferentially distributed cascade boxes through which the bypass flow is deflected.

The engine further comprises a mounting assembly for attaching the engine to an aircraft at an under wing position. The mounting assembly includes a support structure 133 which is an elongate member extending in an axial direction of the engine to form an under wing pylon. The support structure 133 has a rear mounting formation 134 which allows the structure to be attached to a front wing spar of the aircraft. The mounting assembly includes also includes a load distribution ring 135 which surrounds the outlet guide vanes 124, is coaxial with fan case 125, and is joined at a front side to the case and at a rear side to the TRU 132.

Loads acting on the air intake 111 (e.g. normal aerodynamic loads and exceptional loads) are primarily transmitted to the fan case 125. They are then transmitted to the load distribution ring 135 across the annular interface between the fan case and the ring. The transmission is circumferentially distributed around the interface rather than being focused at one position. The loads are then transferred from the ring 135 to the support structure 133, and thence to the aircraft. In this way, loads such as aerodynamic manoeuvring loads can be prevented from causing core bending.

There are no A-frames extending between the rear of the case 125 and the core engine 126. The radially inner ends of the outlet guide vanes 124 terminate at front and rear annular flanges (not shown) at the leading and trailing edges of the outlet guide vanes, the flanges forming bolted interface with the core engine 126. This non-permanent but rigid interface helps to maintain coaxiality between the core engine 126 and the fan structure, and resists core bending. Although loads can be transferred across the interface, the primary load path for forces acting on the air intake 111, the fan case 125, and the TRU 132, and transmitted to the aircraft, is nonetheless through the load distribution ring 135 and the support structure 133. This allows blade tip clearances to be reduced and can lead to improvements in engine performance and efficiency. Further, the elimination of the A-frames can lead directly to a reduction in engine weight and a reduction in drag in the bypass duct. The elimination of the A-frames can also lead indirectly to weight and drag reductions through decreases in the lengths of the case 125 and the nacelle.

In addition, as a conventional forward engine mount is not required, the distance of the engine from the under side of the wing can be decreased, which can allow the size of the profile fairing covering the pylon to be reduced, which in turn reduces drag.

To attach the core engine 126 to the aircraft, a rear engine mount (not shown) of conventional type can be used, although the reduced duty on the mount caused by load transfer through the load distribution ring 135 and the support structure 133 may allow the adoption of a smaller mount. The mount reacts side, vertical and torque loads. The rigid interface formed between the annular flanges and the core engine 126, allows axial loads to be transferred from the core engine to the annular flanges such that the number or size of the thrust struts (not shown) may be reduced. Indeed, it may be possible to eliminate the thrust struts altogether.

To strengthen and rigidify the load distribution ring 135 and to provide a route for loads on the outlet guide vanes 124 to transfer to the ring, a plurality of circumferentially distributed load transfer webs 137 can be circumferentially distributed around the ring. The webs 137 extend forwardly towards the fan case 125 from a bulkhead part (supplementary portion) 135a of the ring adjacent the TRU 132 to the part 135b of the ring which surrounds the outlet guide vanes 124. The webs may be positioned relative to the outlet guide vanes 124 to improve load transfer from the vanes to the load distribution ring. Although shown in FIGS. 3 and 4 extending 360° around the engine axis, the bulkhead part 135a of the ring can be reduced in circumferential extent, e.g. to extend about 60° from either side of the support structure 133, if the part 135b of the ring surrounding the outlet guide vanes is sufficient on its own to transmit loads from the lower parts of the fan case 125.

The support structure 133 and the load distribution ring 135 are typically formed as an integrated, one-piece structure. For example, they can conveniently be produced primarily from lightweight fibre-reinforced plastic composite material. Advantageously, the composite material can be configured to efficiently transfer loads from the load distribution ring 135 to the support structure 133 (e.g. through appropriate location of the reinforcement fibres). The webs 137 can also be formed integrally with the ring 135 from composite material. The joints between the load distribution ring 135 and the fan case 125 and between the webs 137 and the case 125 can be bolted interfaces.

However, an alternative arrangement is to form the load distribution ring 135 and webs 137 integrally with the fan case 125, and then to join the ring 135 to the support structure 133 at a bolted interface.

The TRU 132 can be formed integrally with the load distribution ring 135 (as shown in FIG. 3) or can be a separate component that is joined to the ring 135 e.g. across a bolted interface. An advantage of an integrated TRU is that the TRU forward bulkhead can become part of the load distribution ring, which can reduce the overall weight of the combination. An upper portion 132a of the TRU can be structurally enhanced to assist the transmission of loads from the load distribution ring to the support structure 133. Conventionally, any connection between the upper portion of a TRU and a pylon would be relatively flexible to ensure that a conventional forward engine mount transmits the engine loads and limits load share through the nacelle. However, with a mounting assembly according to the present invention, the relative stiffness of the connection between the load distribution ring and the support structure permits a load path route through the TRU cascade ring to the support structure 133. For example, an upper forward cascade box region of the TRU can act as a fixed structure transferring loads to the support structure.

Advantageously, the mounting assembly is compatible with on-wing core engine removal at engine overhaul, for example of the type described in EP A 1878662, such that the fan structure (including the intake 111, fan case 125, outlet guide vanes 125 and TRU 132) remains attached to the aircraft. Core engine removal can be facilitated by forming the rigid non-permanent interface between the annular flanges and the core engine 126.

Although not shown in FIGS. 3 and 4, the fan cowl part of the nacelle which covers the fan case 125 is typically be mounted to the inlet 111 and the support structure 133. The rear section of the nacelle which translates back to reveal the circumferentially distributed cascade boxes of the TRU 132 can be mounted to the side walls of the pylon via sliders.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A mounting assembly for attaching a ducted fan gas turbine engine to an aircraft, the engine having an air intake, a propulsive fan, a fan case surrounding the fan, and a core engine, the air intake being attached to the front of the fan case such that loads acting on the air intake are primarily transmitted to the fan case, wherein the assembly includes:
   a support structure extending in an axial direction of the engine and having a rearward region which is adapted to attach to the aircraft, and
   a front engine mount comprising a load distribution ring that is coaxial with, and perpendicular to, the fan case and a thrust reverse unit and that is rearward of the fan case and forward of the thrust reverse unit, the load distribution ring integrally forming a single, non-disassemblable body with the fan case, and being joined to a forward region of the support structure; and
   wherein, in use, the support structure and the load distribution ring provide a primary load path for the loads transmitted to the fan case by the air intake, and thence to the aircraft.

2. A mounting assembly according to claim 1, wherein the primary load path is circumferentially distributed around an annular joint between the fan case and the load distribution ring.

3. A mounting assembly according to claim 1, wherein the load distribution ring is integrally formed with the forward region of the support structure.

4. A mounting assembly according to claim 1, wherein the engine further has a row of outlet guide vanes rearward of the fan case, the load distribution ring surrounding the outlet guide vanes.

5. A mounting assembly according to claim 1 wherein the support structure and the load distribution ring are predominantly formed of composite material.

6. A ducted fan gas turbine engine having an air intake, a propulsive fan, a fan case surrounding the fan, and a core engine, the air intake being attached to the front of the fan case such that loads acting on the air intake are primarily transmitted to the fan case, wherein the gas turbine engine further has a mounting assembly according to claim 1 for attaching the gas turbine engine to an aircraft.

7. An engine according to claim 6 further having a row of outlet guide vanes rearward of the fan case, the load distribution ring surrounding the outlet guide vanes.

8. An engine according to claim 7 whereby the fan case comprises one or more annular flanges, the one or more annular flanges being coaxial with the fan case, and wherein the radially inner ends of the outlet guide vanes terminate at the one or more annular flanges, a non-permanent rigid interface being formed between the engine core and the one or more annular flanges.

9. A mounting assembly for attaching a ducted fan gas turbine engine to an aircraft, the engine having an air intake, a propulsive fan, a fan case surrounding the fan, and a core engine, the air intake being attached to the front of the fan case such that loads acting on the air intake are primarily transmitted to the fan case, wherein the assembly includes: a support structure extending in an axial direction of the engine and having a rearward region which is adapted to attach to the aircraft, a front engine mount comprising a load distribution ring that is coaxial with the fan case and a thrust reverse unit and that is rearward of the fan case and forward of the thrust reverse unit, the load distribution ring integrally forming a single, non-disassemblable body with the fan case, and being joined to a forward region of the support structure; and a plurality of circumferentially distributed load transfer webs extending forward from the load distribution ring towards the fan case, wherein, in use, the support structure and the load distribution ring provide a primary load path for the loads transmitted to the fan case by the air intake, and thence to the aircraft.

* * * * *